(12) United States Patent
Leffert

(10) Patent No.: US 8,788,330 B2
(45) Date of Patent: *Jul. 22, 2014

(54) AUTOMATED DETERMINATION OF APPLICABILITY AND VALUE OF DISCOUNTS FOR A PURCHASE ORDER

(75) Inventor: Jonathan B. Leffert, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/560,907

(22) Filed: Jul. 27, 2012

(65) Prior Publication Data

US 2013/0024264 A1    Jan. 24, 2013

Related U.S. Application Data

(63) Continuation of application No. 11/015,189, filed on Dec. 16, 2004, now Pat. No. 8,265,991.

(51) Int. Cl.
*G06Q 30/00* (2012.01)

(52) U.S. Cl.
USPC ...................................................... 705/14.13

(58) Field of Classification Search
USPC ...................................................... 705/14.13
See application file for complete search history.

(56) References Cited

U.S. PATENT DOCUMENTS

| | | | |
|---|---|---|---|
| 5,321,639 A | 6/1994 | Krishnamoorthy et al. | |
| 5,710,887 A * | 1/1998 | Chelliah et al. | 705/26.62 |
| 6,052,710 A * | 4/2000 | Saliba et al. | 709/203 |
| 6,151,631 A | 11/2000 | Ansell et al. | |
| 6,205,433 B1 | 3/2001 | Boesch et al. | |
| 6,311,190 B1 | 10/2001 | Bayer et al. | |
| 6,327,535 B1 | 12/2001 | Evans et al. | |
| 6,460,020 B1 | 10/2002 | Pool et al. | |
| 6,611,811 B1 | 8/2003 | Deaton et al. | 705/14 |
| 6,623,529 B1 | 9/2003 | Lakritz | |
| 6,665,715 B1 | 12/2003 | Houri | |
| 6,757,740 B1 | 6/2004 | Parekh et al. | |
| 6,826,617 B1 | 11/2004 | Ansell et al. | |
| 7,424,543 B2 | 9/2008 | Rice, III | 709/229 |
| 7,996,351 B1 | 8/2011 | Leffert et al. | |
| 2001/0051959 A1 | 12/2001 | Penn et al. | |

(Continued)

OTHER PUBLICATIONS

U.S. Appl. No. 13/179,478, filed Jul. 8, 2011, Leffert, Jonathan B., et al.

(Continued)

*Primary Examiner* — Saba Dagnew
(74) *Attorney, Agent, or Firm* — Novak Druce Connolly Bove + Quigg LLP

(57) ABSTRACT

A method for automatically determining applicability and value of any discounts for a purchase order from a client computer, the determinations being made by the client computer itself. In some embodiments, the client computer receives (from a server to which the order is being placed) coupon programming, determines applicability and value of discounts using the coupon programming, and sends discount information for an order to the server. The coupon programming may comprise a rule engine, implemented by rule programming, having one or more sets of rules and a processing relationship between the sets of rules and the rules in each set of rules. The rule engine may comprise a recursive rule program. In some embodiments, the applicability and value of any discounts for an order is determined by a server that receives the order, the determinations being made by using a rule engine implemented by rule programming.

17 Claims, 11 Drawing Sheets

(56) References Cited

U.S. PATENT DOCUMENTS

| | | |
|---|---|---|
| 2002/0007309 A1 | 1/2002 | Reynar |
| 2002/0138588 A1 | 9/2002 | Leeds |
| 2002/0147790 A1 | 10/2002 | Snow |
| 2002/0174010 A1 | 11/2002 | Rice, III ............ 705/14 |
| 2002/0174421 A1 | 11/2002 | Zhao et al. |
| 2002/0199182 A1 | 12/2002 | Whitehead |
| 2003/0007188 A1 | 1/2003 | Hoshino et al. |
| 2003/0023712 A1 | 1/2003 | Zhao et al. |
| 2003/0065571 A1 | 4/2003 | Dutta |
| 2003/0074471 A1 | 4/2003 | Anderson et al. |
| 2003/0110130 A1 | 6/2003 | Pelletier |
| 2003/0115258 A1 | 6/2003 | Baumeister et al. |
| 2003/0144850 A1 | 7/2003 | Franks et al. |
| 2004/0019530 A1 | 1/2004 | Broussard et al. |
| 2004/0030490 A1 | 2/2004 | Hegedus et al. |
| 2004/0122656 A1 | 6/2004 | Abir |
| 2004/0139003 A1 | 7/2004 | Udiani |
| 2004/0168122 A1 | 8/2004 | Kobipalayam Murugaiyan |
| 2004/0172331 A1 | 9/2004 | Merriman et al. |
| 2004/0199623 A1 | 10/2004 | Houri |
| 2004/0215693 A1 | 10/2004 | Thompson |
| 2004/0220884 A1 | 11/2004 | Khan |
| 2004/0243471 A1 | 12/2004 | Salmen |

OTHER PUBLICATIONS

Updated portions of prosecution history of U.S. Appl. No. 11/016,673, Jul. 7, 2011, Leffert, Jonathan B., et al.

Updated portions of prosecution history of U.S. Appl. No. 11/016,673, Jun. 23, 2011, Leffert, Jonathan B., et al.

Updated portions of prosecution history of U.S. Appl. No. 11/016,673, Mar. 24, 2011 Leffert, Jonathan B., et al.

Kotler, Philip, et al., "Principles of Marketing Eighth Edition", Month Unknown, 1999, pp. 577-603, Chapter 19, Prentice-Hall, Inc., Upper Saddle River, NJ, USA.

U.S. Appl. No. 11/016,673, filed Dec. 16, 2004, Leffert, Jonathan B. et al.

Portions of prosecution history of U.S. Appl. No. 11/016,673, Feb. 4, 2010, Leffert, Jonathan B., et al.

Non-Final Office Action of U.S. Appl. No. 11/016,673, mailing date Sep. 14, 2006, Leffert, Jonathan B., et al.

\* cited by examiner

AUTOMATED DETERMINATION OF APPLICABILITY AND VALUE OF DISCOUNTS FOR A PURCHASE ORDER

CROSS REFERENCE TO RELATED APPLICATION

This application is a continuation of U.S. patent application Ser. No. 11/015,189, filed Dec. 16, 2004, entitled "Automated Determination of Applicability and Value of Discounts for a Purchase Order" which is a continuation of which is hereby incorporated by reference herein.

FIELD OF THE INVENTION

The present invention is directed towards automated determination of applicability and value of any discounts for a purchase order.

BACKGROUND OF THE INVENTION

Product purchases made through the Internet (e.g., via the World Wide Web) have increased rapidly with the growing popularity of the Internet. On-line retail ordering allows users to conveniently place orders for products from a client computer. For example, users can order products from a seller's Web site by submitting a purchase order to the seller's server which receives and processes the purchase order.

Often, a seller will encourage sales of products by promoting (e.g., through websites, newspaper advertisements, etc.) particular types of discounts offered by the seller. For example, a discount type where the user gets 15% off the total price of an order if the user spends over $100 may be promoted. Typically the applicability and value of any discounts for a purchase order is determined by the server upon receiving the order from the client computer. However, whenever the user changes the order before confirming the order, updated order information must be sent to the server, the server must re-determine applicability and value of any discount types for the order, and this information must re-sent back to the client computer. Thus, the conventional process for determining applicability and value of any discount types for an order is typically inefficient and requires multiple accesses to the server and multiple computations by the server.

As such, there is a need for a more efficient method for determining applicability and value of any discount types for an order received from a client computer. There is also a need for an efficient method for determining applicability and value of complex discount schemes for an order, for example, where applicability of a single discount type is difficult to determine or where multiple discount types may apply for a single purchase order.

SUMMARY OF THE INVENTION

A method for automatically determining (without human intervention) applicability of any discount types and the value of any applicable discount types for a purchase order from a client computer is provided. In some embodiments, the client computer is used by a user to interact with a server to submit a purchase order for one or more products to the server. In some embodiments, the client computer is used to submit a coupon code to the server whereby the server retrieves particular coupon programming. instructions based on the coupon code and sends the coupon programming instructions to the client computer. Using the coupon programming, the client computer determines applicability and value of one or more discount types for a purchase order being made by a user from the client computer. If the client computer receives updated order information from the user, the client computer re-computes the applicability and value of any discount types for the purchase order using the coupon programming. If the client computer receives an order confirmation from the user, the client computer sends the order information/data and the determined discount information/data associated with the purchase order to the server.

In some embodiments, the set of coupon programming instructions comprises a rule engine implemented by rule programming, the rule engine comprising one or more sets of rules and a processing relationship between the sets of rules and the rules in each set of rules. In some embodiments, the one or more sets of rules of the rule engine comprises one or more sets of primary rules and one or more sets of secondary rules. In some embodiments, each discount type has an associated set of primary rules and an associated set of secondary rules where the associated set of primary rules is used to determine applicability of the discount type and the associated set of secondary rules is used to determine a discount value for the discount type, wherein the set of secondary rules is called for processing if the discount type is determined to be applicable by the set of primary rules. In some embodiments, the rule engine comprises a recursive rule program.

In some embodiments, the applicability and value of any discount types for a purchase order is determined by a server that receives the order, the determination being made using a rule engine implemented by rule programming.

DETAILED DESCRIPTION

Figure 1:
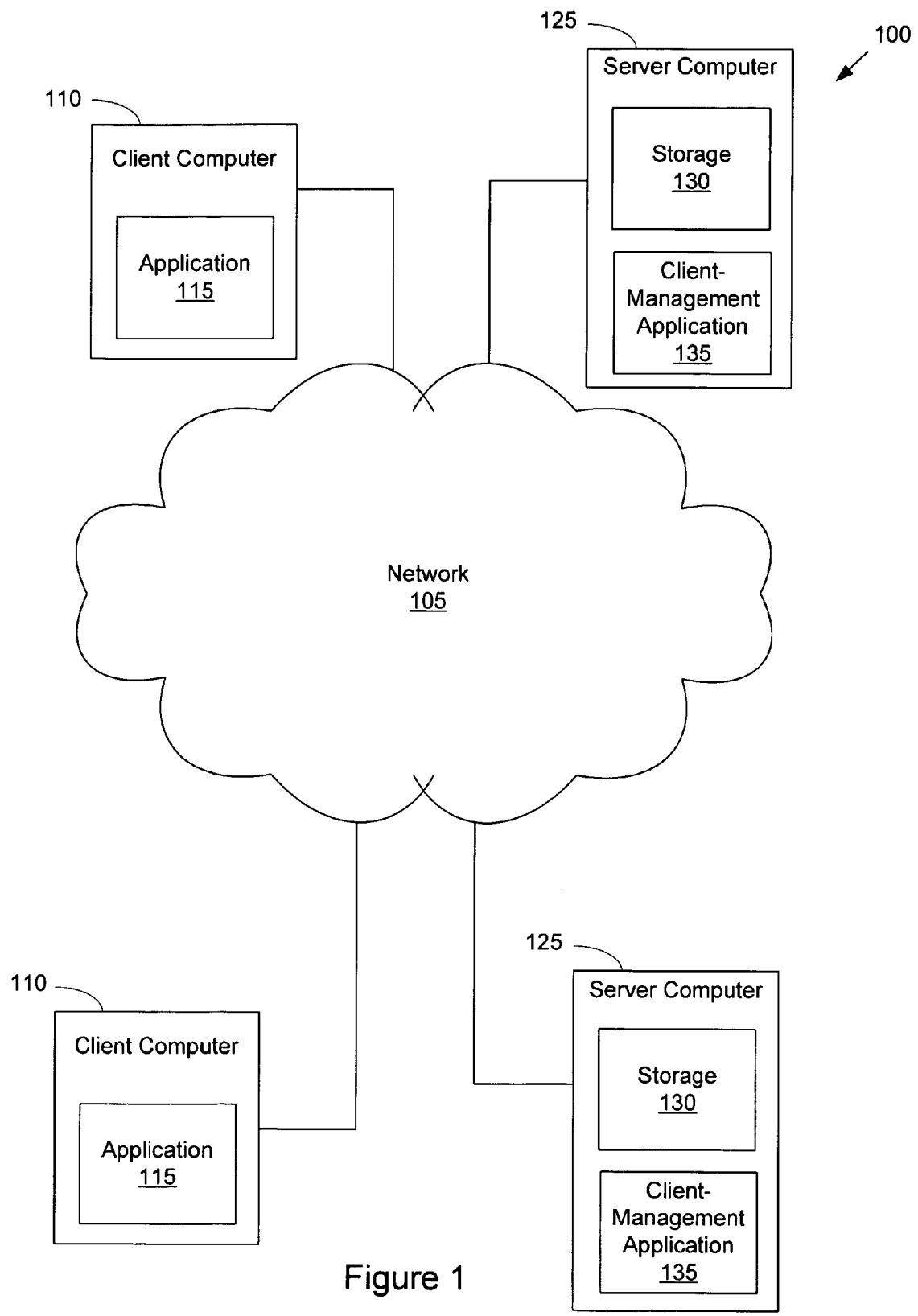
FIG. 1 illustrates a conceptual diagram of a network environment in which the present invention operates.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

A method for automatically determining (without human intervention) applicability of any discount types and the value of any applicable discount types for a purchase order from a client computer is provided. In some embodiments, the client computer is used by a user to interact with a server to submit a purchase order for one or more products to the server. In some embodiments, the client computer is used to submit a coupon code to the server whereby the server retrieves particular coupon programming instructions based on the coupon code and sends the coupon programming instructions to the client computer. Using the coupon programming, the client computer determines applicability and value of one or more discount types for a purchase order being made by a user from the client computer. If the client computer receives updated order information from the user, the client computer re-computes the applicability and value of any discount types for the purchase order using the coupon programming. If the client computer receives an order confirmation from the user, the client computer sends the order information/data and the determined discount information/data associated with the purchase order to the server.

In some embodiments, the set of coupon programming instructions comprises a rule engine implemented by rule programming, the rule engine comprising one or more sets of rules and a processing relationship between the sets of rules and the rules in each set of rules. In some embodiments, the one or more sets of rules of the rule engine comprises one or more sets of primary rules and one or more sets of secondary rules. In some embodiments, each discount type has an associated set of primary rules and an associated set of secondary rules where the associated set of primary rules is used to determine applicability of the discount type and the associated set of secondary rules is used to determine a discount value for the discount type, wherein the set of secondary rules is called for processing if the discount type is determined to be applicable by the set of primary rules. In some embodiments, the rule engine comprises a recursive rule program.

In some embodiments, the applicability and value of any discount types for a purchase order is determined by a server that receives the order, the determination being made using a rule engine implemented by rule programming.

Several embodiments are described below in relation to a multimedia application through which a client computer can submit a purchase order for photo prints to a server connected with the client computer. One of ordinary skill in the art, however, will realize that the processes of the invention can relate to any application executing on a client computer that interfaces with a server.

Network Environment

FIG. 1 illustrates a conceptual diagram of a network environment 100 in which the present invention operates. The environment 100 includes a network 105 (such as a LAN, WAN, the Internet, an Intranet, etc.) connecting a plurality of client computers 110 and a plurality of server computers 125.

A client computer 110 may be any form of device that is configured to interface with a network 105 and to send and receive data to and from a server 125. Examples of client computers 110 are desktop computers, laptop computers, server computers, portable computing devices (such as personal data assistants or cellular phones), etc. The client computer 110 typically executes an application 115 that interfaces with the network 105 and interacts with a server 125 to send and retrieve data to and from the server 125.

In some embodiments, the application 115 is configured to perform the methods of the present invention. Examples of applications 115 include web browsers, multimedia applications, etc. As an example, the client computer 110 may execute a multimedia application for editing, managing, and publishing photos and ordering photo prints or other products from a server, the application having a custom interface with the server for exchanging data. An example of such a multimedia application is described in U.S. patent application Ser. No. 10/042,944, filed Jan. 6, 2002, entitled "Method and Apparatus for Image Acquisition, Organization, Manipulation, and Publication," now issued as U.S. Pat. No. 6,850,247, which is incorporated herein by reference.

In some embodiments, the client computer 110 is used by a user to interact with a server 125 to submit a purchase order for one or more products. In some embodiments, the client computer 110 is also used to submit a coupon code to the server and receive coupon programming from the server based on the coupon code. The coupon code is typically made known to the user through promotions (e.g., through websites, newspaper advertisements, etc.) and is associated with one or more discount types that are also made known to the user through the promotions. Using order information/data associated with the order, product information/data associated with one or more products in the order, and the received coupon programming, the client computer then determines applicability and value of any discount types associated with the order and sends discount and purchase order information/data to the server.

In some embodiments, a server computer 125 includes a storage structure 130 containing data and/or executable programming instructions. A server 125 may be accessed by multiple client computers 110 that request and receive data and/or executable programming instructions from the server. The server 125 may execute a client-management application 135 that receives requests from client computers, retrieves requested data and/or instructions from the storage 130, and sends the data and/or instructions to the client computers 110.

In some embodiments, the storage 130 of the server 125 contains product information/data for products available for ordering, sets of coupon programming instructions for determining applicability of any discount types related to a purchase order, and sets of coupon programming instructions for determining discount values for any applicable discount types. In some embodiments, each set of coupon programming instructions is associated with a particular discount type. In some embodiments, the server receives a coupon code from the client computer where the coupon code may have a single associated discount type (e.g., if the user buys three "5×7" prints, the user will receive a fourth "5×7" print for free) or two or more associated discount types (e.g., if the user buys three "5×7" prints, the user will receive a fourth "5 ×7" print for free and if the user spends $50 or more, the user will get $5 off the shipping price). Based on the received coupon code, the server retrieves all sets of coupon programming instructions for all discount types associated with the coupon code.

Client-Side Determination of Discounts

Figure 2:
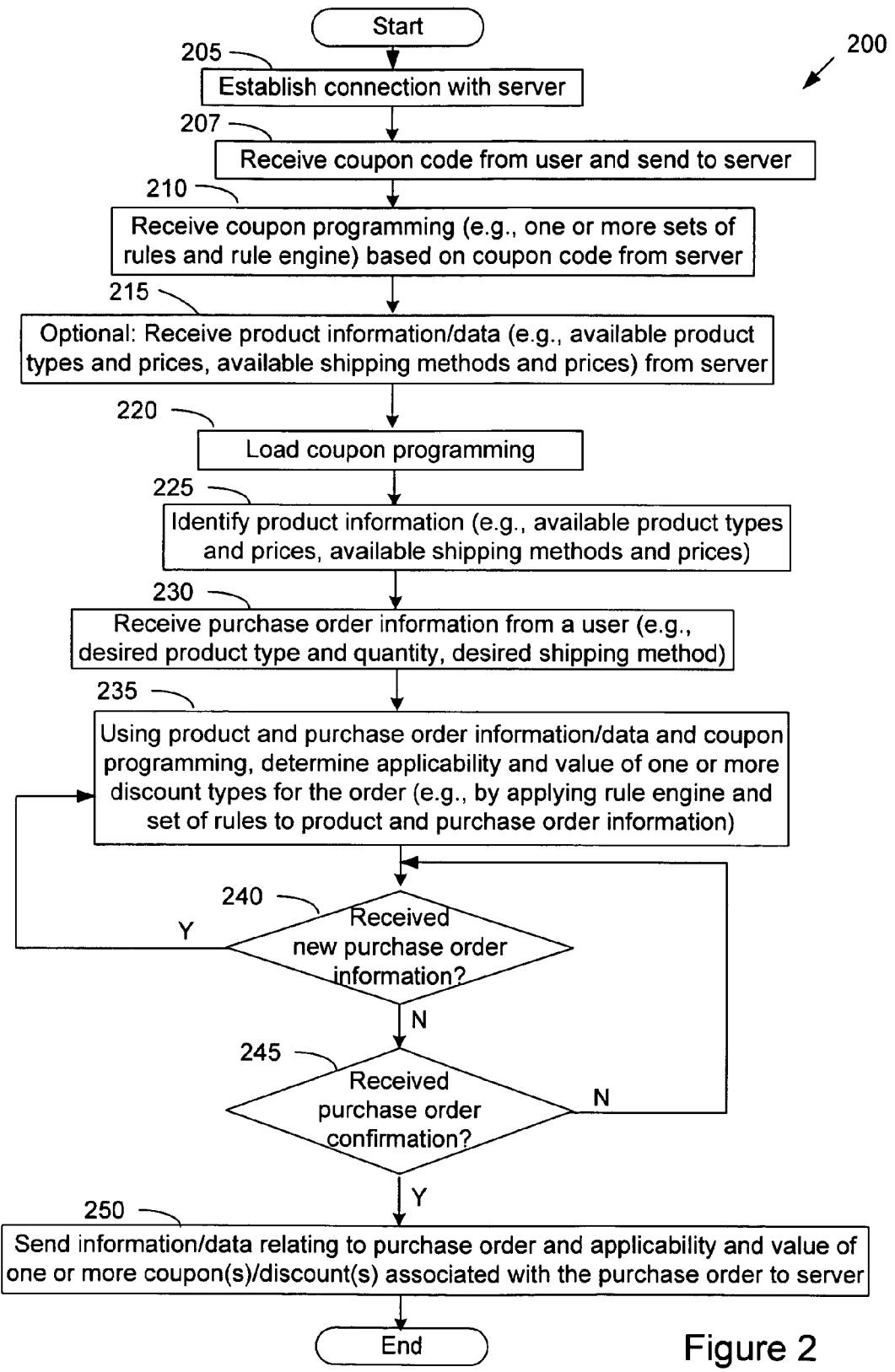
FIG. 2 is a flowchart for a client-side method for automatically determining applicability and value of any discount types for a purchase order made from a client computer, the determinations being made by the client computer itself.

FIG. 2 is a flowchart for a client-side method 200 for automatically determining (without human intervention) applicability and value of any discount types for a purchase order made from a client computer, the determinations being made by the client computer itself. The client-side method 200 may be implemented, for example, by a client computer and an application executing on the client computer, the client computer and application receiving input from a user. In some embodiments, the application is configured to perform the methods of the present invention.

The method 200 begins when it establishes (at 205) a connection (e.g., via a network) with a server to which the order is being sent. The method then receives (at 207) a coupon code from a user and sends the coupon code to the server. The coupon code is associated with one or more discount types. The method then receives (at 210) one or more sets of coupon programming instructions from the server based on the coupon code, the one or more sets of coupon programming instructions being associated with the one or more discount types (as discussed below in relation to FIG. 3).

In some embodiments, the coupon programming instructions comprise a rule engine implemented by rule programming, the rule engine comprising one or more sets of rules and a processing relationship between the sets of rules and the rules in each set of rules. In some embodiments, the rule engine comprises a recursive rule program implemented by rule programming. In some embodiments, the one or more sets of rules comprises a set of primary rules and a set of secondary rules, the set of primary rules being used to determine applicability of a particular discount type and the set of secondary rules being used to determine a discount value for the particular discount type, wherein the set of secondary rules is called for processing if the particular discount type is determined to be applicable by the set of primary rules.

As an optional step, the method also receives (at 215) product information/data from the server. Product information/data may include, for example, available product types and per item prices for each product type (e.g., "3×5" prints at $0.60 per print, "5×7" prints at $0.90 per print, photo albums at $6.99 per photo album, etc.), available shipping methods and prices, etc. The method loads (at 220) the set(s) of coupon programming instructions and identifies (at 225) available product information/data. In some embodiments, the product information is received (at 215) from the server. In other embodiments, the product information is contained in the application executing on the client computer.

The method then receives (at 230) purchase order information from the user. Purchase order information may include, for example, product types and the quantity for each product type desired by the user, the shipping method desired by the user, etc. For example, the purchase order information may comprise an order for six "3×5" prints, two "5×7" prints, and one photo album being delivered via express mail.

Using the order information associated with the order, product information associated with one or more products in the order, and the received set of coupon programming instructions, the method then determines (at 235) applicability of any discount types for the order and the value of any such applicable discounts (the information/data relating to such being referred to herein as determined discount information/data). In some embodiments, the method determines (at 235) discount applicability and value by applying a rule engine implemented by rule programming to the product and order information.

The method then determines (at 240) if any new purchase order information has been received from the user (for example, if the user decides to change the ordered quantity of a particular product). If so, the method re-determines (at 235) the applicability of any discount types for the order and the value of any such applicable discounts taking into account the new purchase order information. If not, the method determines (at 245) if a purchase order confirmation has been received from the user. If not, the method continues at step 240 where it checks for any new order information from the user.

If a purchase order confirmation has been received from the user (at 245- Yes), the method sends (at 250) the purchase order information and the determined discount information (i.e., applicability of any discount types and the value of any such applicable discounts) associated with the purchase order to the server. The method then ends.

Figure 3:
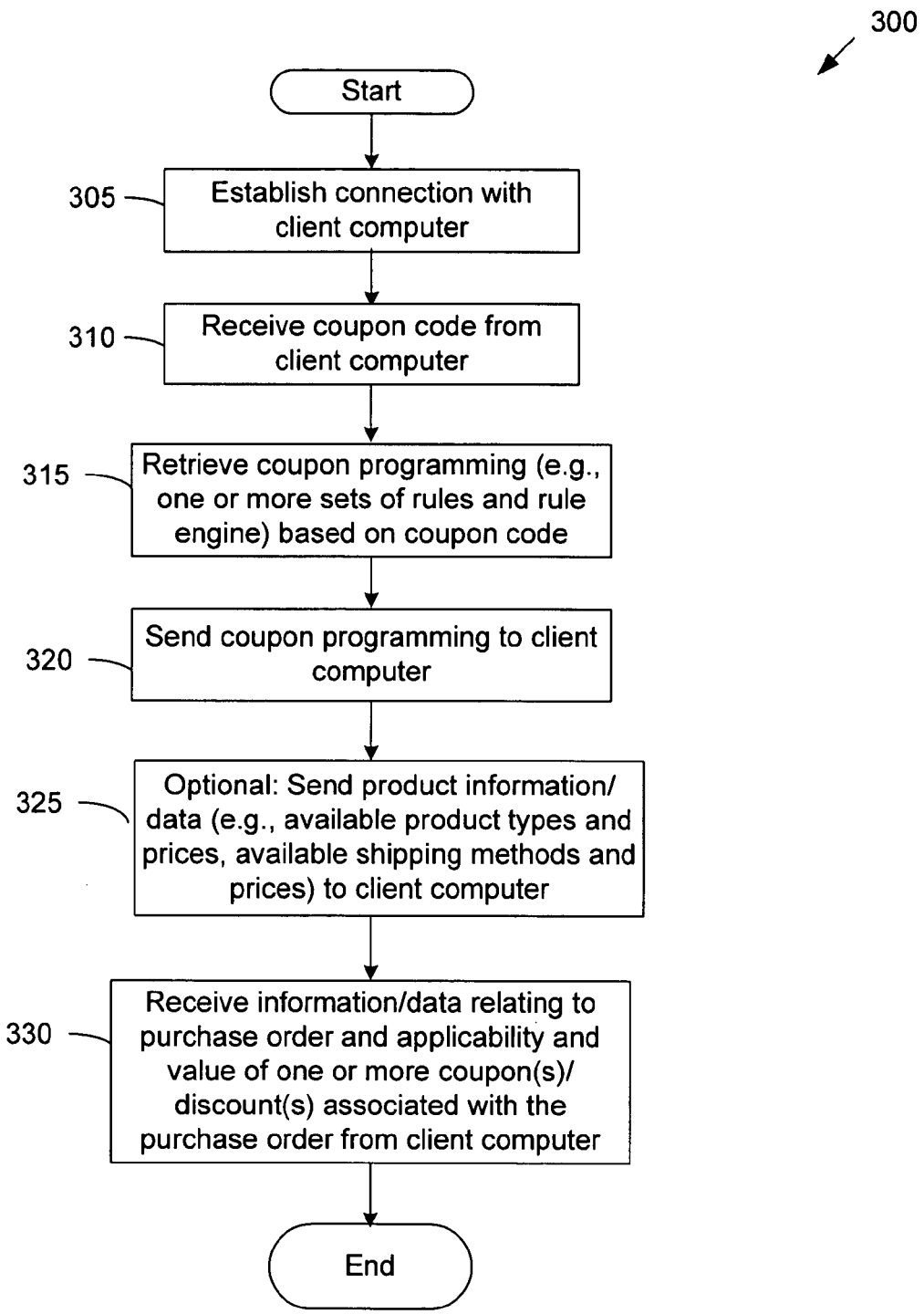
FIG. 3 is a flowchart for a server-side method for automatically determining applicability and value of any discount types for a purchase order made from a client computer, the determinations being made by the client computer itself

FIG. 3 is a flowchart for a server-side method 300 for automatically determining applicability and value of any discount types for a purchase order made from a client computer, the determinations being made by the client computer itself. The server-side method 300 may be implemented, for example, by a server computer connected with the client computer and a client-management application executing on the server computer. In some embodiments, the client-management application is configured to perform the methods of the present invention.

The method 300 begins when it establishes (at 305) a connection (e.g., via a network) with a client computer from which the order is received. The method then receives (at 310) a coupon code from the client computer, the coupon code being associated with one or more discount types. At step 315, the method then retrieves (e.g., from a storage structure of the server computer) one or more sets of coupon programming instructions (associated with the one or more discount types) based on the coupon code. The method 300 then sends (at 320) the retrieved set(s) of coupon programming instructions to the client computer. As an optional step, the method 300 also sends (at 325) product information (e.g., available product types and prices, available shipping methods and prices, etc.) to the client computer.

The method then receives (at 330) purchase order information (e.g., product types and the quantity for each product type desired by a user, shipping method desired by the user, etc.) and discount information (i.e., applicability of any discount types and the value of any such applicable discounts) associated with the purchase order from the client computer. The method then ends.

Set of Rules and Rule Engine

Figure 4:
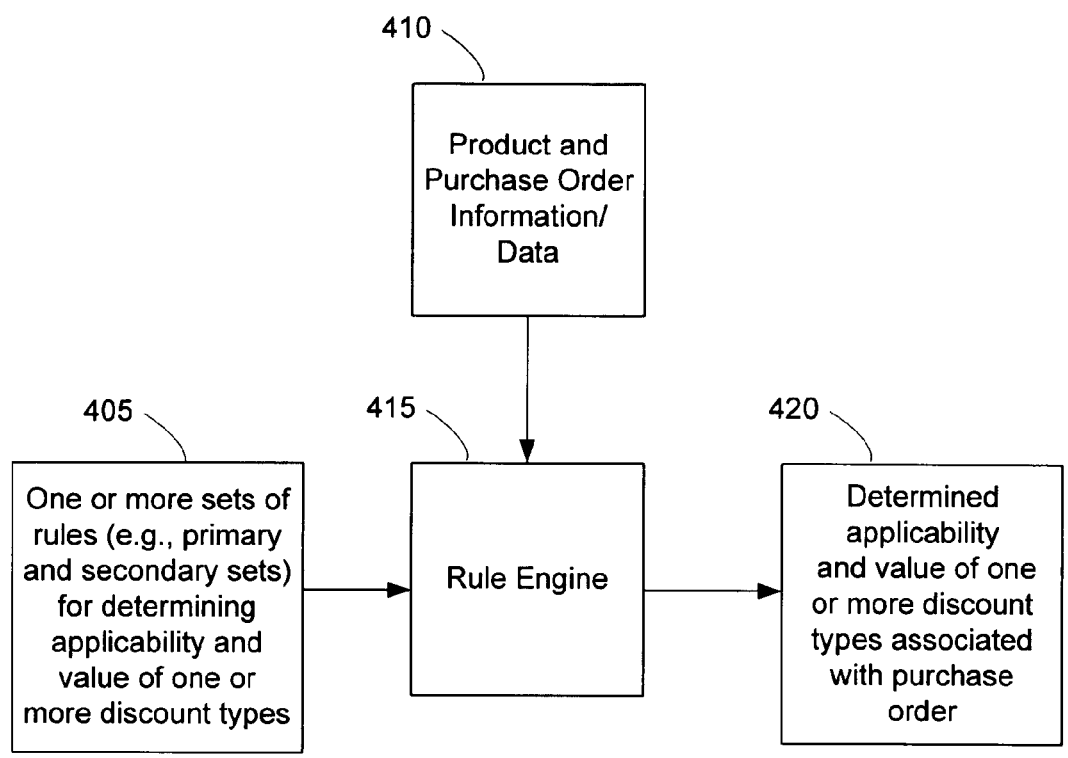
FIG. 4 illustrates a conceptual diagram of the processes of a rule engine.

In some embodiments, the coupon programming instructions comprise a rule engine implemented by rule programming, the rule engine comprising one or more sets of rules and a processing relationship between the sets of rules and the rules in each set of rules. FIG. 4 illustrates a conceptual diagram of the processes of a rule engine 415. In some embodiments, the processes shown in FIG. 4 comprise step 235 of FIG. 2. As shown in FIG. 4, the rule engine 415 receives as input one or more sets of rules 405 (for determining applicability and value of discount types) and product and order information 410 for an order. Using these inputs, the rule engine outputs determined discount information 420 (i.e., determined applicability and value of any discount types associated with the order).

As discussed above, a coupon code has one or more associated discount types, each discount type having a corresponding set of coupon programming instructions that are used to determine applicability and value of the discount type.

In some embodiments, each set of coupon programming instructions for an associated discount type comprises a set of primary rules and a set of secondary rules, the set of primary rules determining applicability of the discount type and the set of secondary rules determining the value of the discount type if it is applicable. Since a coupon code can have more than one associated discount type, the sets of rules 405 received by the rule engine 415 may comprise more than one set of primary rules and more than one set of secondary rules.

Figure 5:
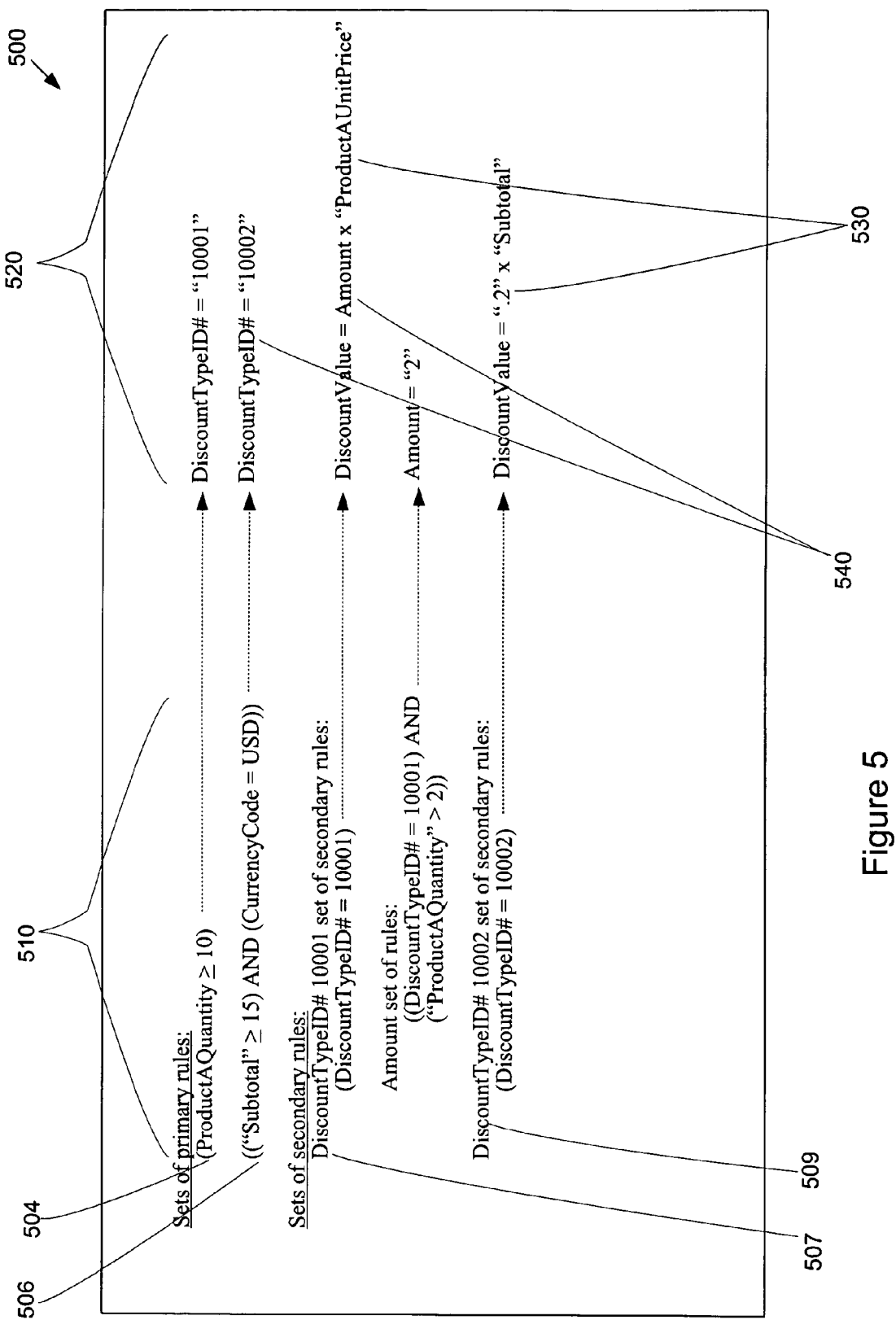
FIG. 5 shows a conceptual example of sets of rules associated with two discount types.

FIG. 5 shows a conceptual example of sets of rules 500 associated with two discount types, the sets of rules 500. In the example of FIG. 5, the two discount types are associated with the same coupon code and the sets of rules 500 are retrieved based on the coupon code and used by the rule engine 415. The sets of rules 500 comprise a first set of primary rules 504, a second set of primary rules 506, a first set of secondary rules 507, and a second set of secondary rules 509.

In the example of FIG. 5, the first set of primary rules 504 and the first set of secondary rules 507 are associated with the following first discount type: if the user purchases 10 or more items of product A, the user will get 2 items of product A for free (for example, where product A is a "5×7" print). The first discount type is identified and associated with the discount type identification number 10001 (DiscountTypeID#: 10001 ). The second set of primary rules 506 and the second set of secondary rules 509 are associated with the following second discount type: if the user spends $15 or more, the user will get 20% off the total price. The second discount type is identified and associated with the discount type identification number 10002 (DiscountTypeID#: 10002 ).

Each rule in the set of rules 500 comprises an antecedent/qualification (left hand side) 510 and an inference/consequence (right hand side) 520. A rule is processed by the rule engine that examines the qualification of the rule to determine if the qualification is true using the product and/or order information. If the qualification of the rule is found to be true, the inference of the rule is made/determined and examined. In some embodiments, an inference of a rule comprises another set of rules 540, a numerical value 530, or a combination of the two. For illustrative purposes, in FIG. 5, all numerical values 530 are shown in between quotation marks. As used herein, a numerical value is any number value that is presently known without requiring further processing of rules in the set of rules 500. In some embodiments, numerical values are set number values (e.g., "2") or known number values derived from product or order information (e.g., "ProductAUnitPrice," "Subtotal," etc.).

If the antecedent of a rule is determined to be true and the inference of the rule contains a set of rules, the set of rules identified in the inference is called for processing by the rule engine. For example, for the rule (DiscountTypeID#= 10001 )---->DiscountValue=Amount×"ProductAUnitPrice," if the antecedent (DiscountTypeID#=10001 ) is determined to be true, the inference (DiscountValue=Amount×"ProductAUnitPrice") is made. Note that the inference contains another set of rules (Amount) and a numerical value ("ProductAUnitPrice"). As such, the Amount set of rules is called for processing. As shown in the example of FIG. 5, the Amount set of rules comprises one rule: ((DiscountTypeID#=10001 ) AND ("ProductAQuantity">2 ))---- >Amount ="2. " Since "ProductAUnitPrice" is a known value derived from product information, no set of rules are called for "ProductAUnitPrice."

In general, the rule engine calls and processes rules in a set of primary rules to determine applicability of a discount type for an order. If the discount type is determined to be applicable, the rule engine calls and processes the set of secondary rules associated with the discount type to determine the value of the discount type for the order. In some embodiments, more than one discount type may be applicable for an order, and thus more than one set of primary rules and more than one set of secondary rules are processed by the rule engine for the order. In some embodiments, if more than one discount type is found to be applicable for the order, the total discount value for all discount types is also determined.

If the rule engine is processing a set of primary rules and reaches a numerical value inference indicating a discount type identification number (DiscountTypeID#), this indicates that the discount type associated with the discount type identification number is applicable to the purchase order. Thus, the set of secondary rules (identified by the DiscountTypeID#) associated with the discount type is then called and processed by the rule engine. In processing the set of secondary rules, if the rule engine reaches a numerical value inference indicating a discount value (DiscountValue), this numerical value indicates that the value of the particular discount type for the purchase order.

For example, for the primary rule: (ProductAQuantity>10)---->DiscountTypeID#="10001, " if the antecedent (ProductAQuantity≥10) is determined to be true, the inference (DiscountTypeID#="10001") is made. The numerical value 10001 indicates an applicable discount type (if the user purchases 10 or more items of product A, the user will get 2 items of product A for free). Since applicability of this discount type has been determined, the set of secondary rules associated with this discount type is then called for processing to determine the value of the discount type. As shown in FIG. 5, the DiscountTypeID#10001 set of rules comprises:

(DiscountTypeID#=10001)---->DiscountValue= Amount×"ProductAUnitPrice"

Amount set of rules:

((DiscountTypeID#=10001) AND ("ProductAQuantity">2))---->Amount="2"

Rule Engine as a Recursive Program

Figure 6:
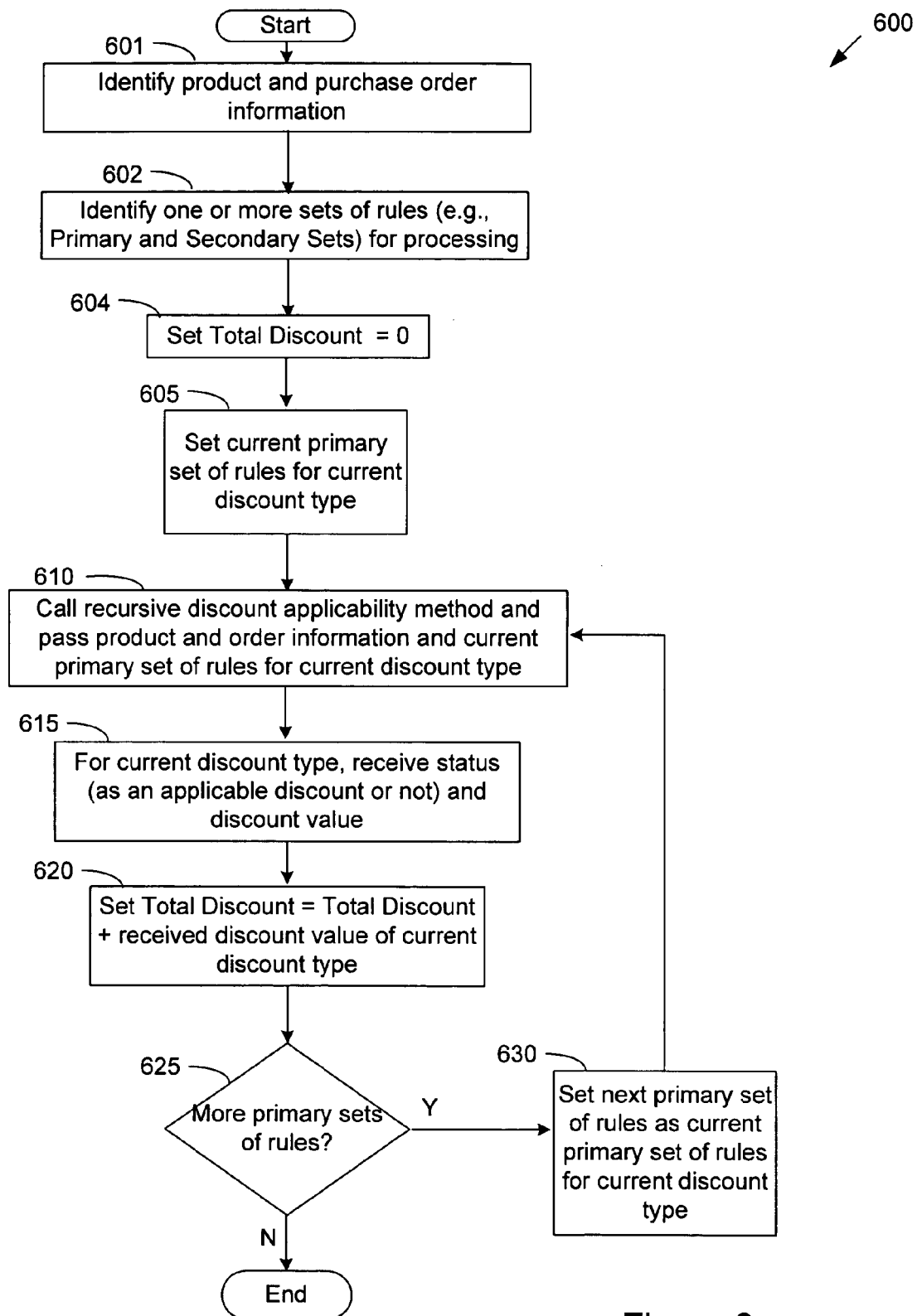
FIG. 6 is a flowchart of a general discount method for a purchase order.
Figure 7:
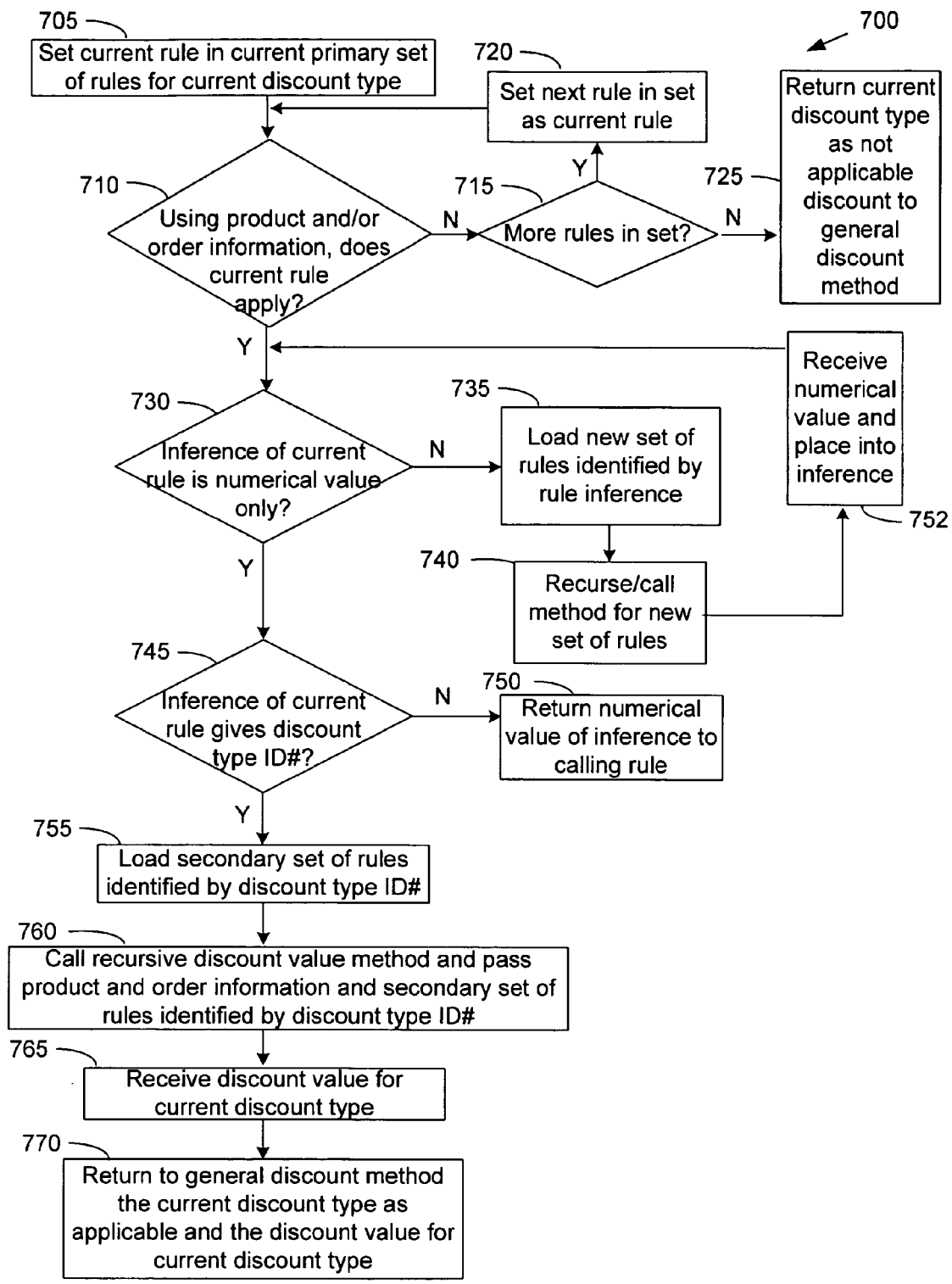
FIG. 7 is a flowchart of a recursive discount applicability method called by the general discount method of FIG. 6.
Figure 8:
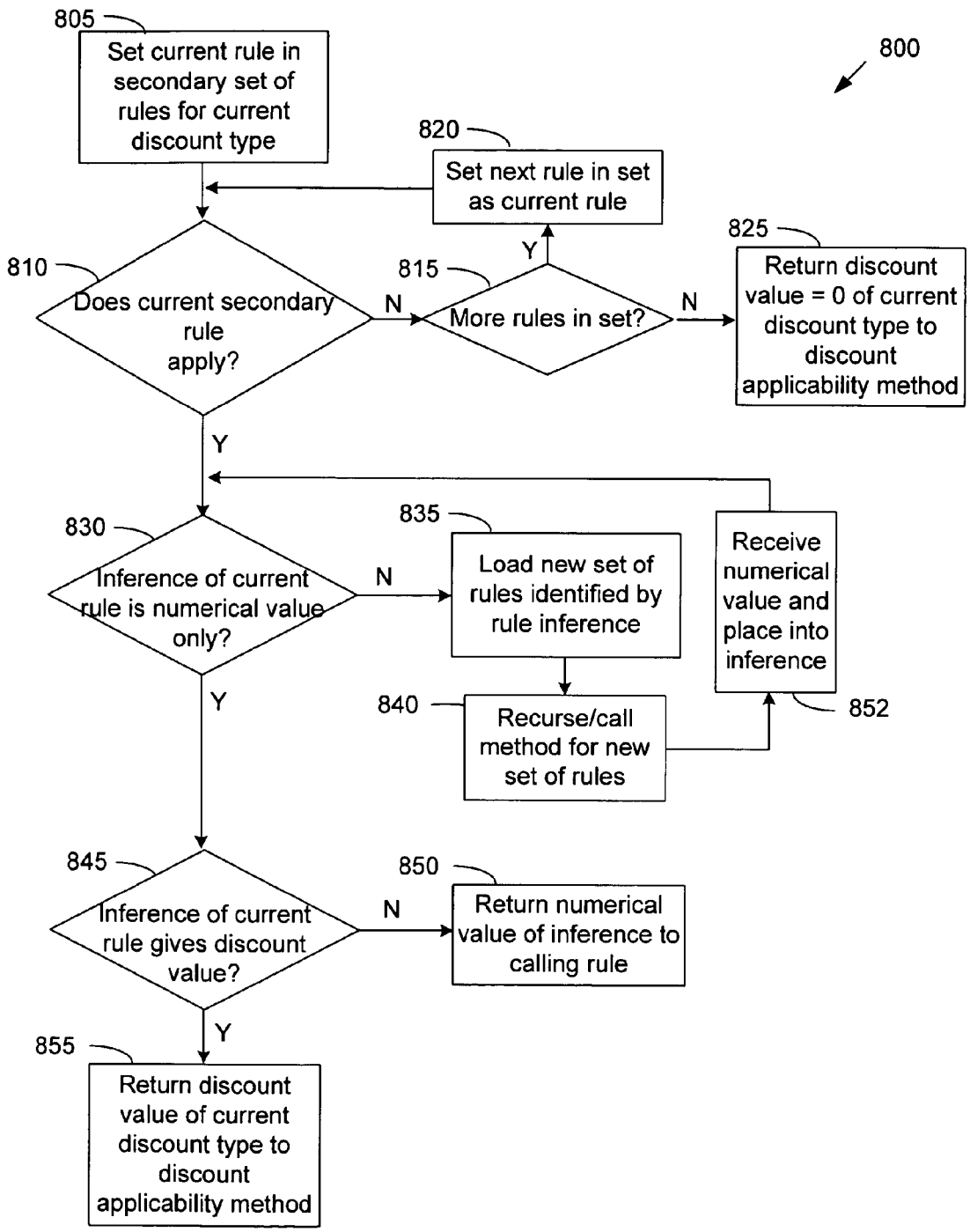
FIG. 8 is a flowchart of a recursive discount value method called by the recursive discount applicability method of FIG. 7.

As described above, the rule engine continues to call and process rules in a set of primary and secondary rules until applicability and value of discount types for an order are determined. As such, the rule engine can be viewed as a recursive rule program that calls upon itself. FIGS. 6, 7, and 8 are flowcharts of the processes of the rule engine as a recursive rule program. In some embodiments, the processes of the rule engine described in relation to FIGS. 6, 7, and 8 comprise step 235 of FIG. 2.

FIG. 6 is a flowchart of a general discount determination method 600 for a purchase order. FIG. 6 is described in relation to FIGS. 2, 7, and 8. The general discount method 600 begins by identifying (at 601) product information (determined at step 225 of FIG. 2) and purchase order information (received at steps 230 and 240 of FIG. 2). The method 600 then identifies (at 602) one or more sets of rules for processing (received at step 210 of FIG. 2) including one or more sets of primary rules and one or more sets of secondary rules (as illustrated in FIG. 4).

The method 600 then sets (at 604) the total discount value to equal zero and sets (at 605) a current set of primary rules (associated with a current discount type) to be processed. The method 600 calls (at 610) a recursive discount applicability method and passes the product and purchase order information and the current set of primary rules (for the current discount type) to the recursive discount applicability method. As discussed below in relation to FIGS. 7 and 8, the recursive discount applicability method 700 processes primary rules to determine applicability of the current discount type and calls a recursive discount value method 800 that processes secondary rules to determine the value of the current discount type.

The method 600 then receives (step 615) a status of the current discount type (as an applicable or non-applicable discount type) and a value of the current discount type if applicable. The method 600 sets (at 620) the total discount value to equal the total discount value plus the received discount value of the current discount type, the total discount value reflecting the total discount value of all applicable discount types for the purchase order.

The method then checks (at 625) if there are more sets of primary rules to be processed. If so, the method sets (at 630) a next set of primary rules as a current set of primary rules for a current discount type and continues at step 610. If not, the method ends.

FIG. 7 is a flowchart of a recursive discount applicability method 700 called (at step 610 of FIG. 6) by the general discount method 600. When the general discount method 600 calls the discount applicability method 700, the general discount method 600 also passes the product and purchase order information and the current set of primary rules (for the current discount type) to the discount applicability method 700.

The method 70 then sets (at 705) a current primary rule in the set of primary rules. Using the product information and/or order information, the method 700 determines (at 710) whether the current primary rule applies (i.e., whether the antecedent/qualification of the current rule is true). For example, if the antecedent of the current primary rule is (ProductAQuantity≥10), the method uses the order information (which contains the value for ProductAQuantity) to determine whether the antecedent is true. If the method determines that the antecedent is not met (at 710- No), the method then determines (at 715) whether there are more rules in the set of primary rules to process. If so, the method sets (at 720) a next rule in the set as the current rule. If not, the method returns (at 725) to the general discount method 600 a status of the current discount type as being a non-applicable discount type for the purchase order.

If the method determines that the antecedent of the current rule is met (at 710- Yes), the method then determines (at 730) if the inference of the current rule comprises a numerical value only. If not, this indicates that, although the inference may contain one or more numerical values, the inference also contains at least one new set of primary rules to be processed and resolved to determine a numerical value to replace/substitute the new set of primary rules in the inference. As such, the method loads (at 735) the new set of primary rules (which is identified by the rule inference) and recurses/calls the method 700 (at 740) to process the new set of primary rules. The current primary rule that recurses/calls the method 700 at this point (at 740) is referred to as the calling rule.

If the method determines (at 730- Yes) that the inference of the current rule comprises a numerical value only, the method then determines (at 745) if the inference of the current rule comprises a discount type identification number (DiscountTypeID#). If not, this indicates that the numerical value of the inference is a value required by a calling rule that is used to replace a set of rules in the inference of the calling rule. As such, the method returns (at 750) the numerical value of the inference to the calling rule. This returns the method to step 752 (the step after the calling rule recursed the method 700) where the numerical value is received and placed (at 752) into the inference of the calling rule, the numerical value substituting a set of rules in the inference of the calling rule.

If the method determines (at 745- Yes) that the inference of the current rule comprises a discount type identification number (e.g., where the inference comprises DiscountTypeID#="10001"), this indicates that the current discount type is applicable and is associated with the determined discount type identification number (e.g., 10001). As such, the method loads (at 755) a set of secondary rules identified by the discount type identification number in the inference. For example, if the inference DiscountTypeID#="10001" is determined, the DiscountTypeID#10001 set of secondary rules is loaded.

The method then calls (at 760) the recursive discount value method 800 and passes product and purchase order information and the loaded set of secondary rules (for the current discount type) to the recursive discount value method 800. As discussed below in relation to FIG. 8, the recursive discount value method 700 processes secondary rules to determine the discount value of the current discount type. As such, the method 700 receives (at 765) the discount value for the current discount type from the recursive discount value method 800. The method then returns (at 770) to the general discount method 600 a status of the current discount type as being an applicable discount type for the purchase order and the discount value for current discount type.

FIG. 8 is a flowchart of a recursive discount value method 800 called (at step 760 of FIG. 7) by the recursive discount applicability method 700. When the discount applicability method 700 calls the discount value method 800, the discount applicability method 700 also passes product and purchase order information and a current set of secondary rules (for the current discount type) to the discount value method 800.

The method 800 then sets (at 805) a current secondary rule in the set of secondary rules. The method 800 determines (at 810) whether the current secondary rule applies (i.e., whether the antecedent/qualification of the current rule is true). If the method determines that the antecedent is not met (at 810- No), the method then determines (at 815) whether there are more rules in the set of secondary rules to process. If so, the method sets (at 820) a next rule in the set as the current rule. If not, the method returns (at 825) to the recursive discount applicability method 700 a discount value equal to zero for the current discount type.

If the method determines that the antecedent of the current rule is met (at 810-Yes), the method then determines (at 830) if the inference of the current rule comprises a numerical value only. If not, this indicates that, although the inference may contain one or more numerical values, the inference also contains at least one new set of secondary rules to be processed and resolved (to determine a numerical value to replace/substitute the new set of secondary rules in the inference). As such, the method loads (at 835) the new set of secondary rules (identified by the rule inference) and recurses/calls the method 800 (at 840) to process the new set of secondary rules. The current secondary rule that recurses/calls the method 800 at this point (at 840) is referred to as the calling rule.

If the method determines (at 830- Yes) that the inference of the current rule comprises a numerical value only, the method then determines (at 845) if the inference of the current rule comprises a discount value (DiscountValue). If not, this indicates that the numerical value of the inference is a value required by a calling rule. As such, the method returns (at 850) the numerical value of the inference to the calling rule. This returns the method to step 852 (the step after the calling rule recursed the method 800) where the numerical value is received and placed (at 852) into the inference of the calling rule, the numerical value substituting a set of rules in the inference of the calling rule.

If the method determines (at 845-Yes) that the inference of the current rule comprises a discount value, this indicates the discount value for the current discount type. As such, the method then returns (at 855) to the recursive discount applicability method 700 the discount value for current discount type.

As an example illustration of the process of the recursive discount value method 800, suppose that the discount identification number determined by the discount applicability method 700 is 10001 (DiscountTypeID#=10001) and that the loaded set of secondary rules for DiscountTypeID#10001 comprises:

(DiscountTypeID#=10001)---->DiscountValue= Amount×"ProductAUnitPrice"

Amount set of rules:

((DiscountTypeID#=10001) AND ("ProductAQuantity">2))---->Amount="2"

The method 800 sets (at 805) the first rule in the set ((DiscountTypeID#=10001)---->DiscountValue=Amount×"ProductAUnitPrice") as the current rule. The method then determines (at 810) that the antecedent of the current rule is true (since the discount identification number was previously determined to be 10001). As such, the method then determines (at 830) if the inference of the current rule comprises a numerical value only. This is determined not to be true since the inference contains Amount which is not a numerical value and indicates a new set of rules.

The method then loads (at 835) the Amount set of secondary rules and recurses/calls the method 800 to process the Amount set of secondary rules. The Amount set of rules comprises only one rule (((DiscountTypeID#=10001) AND ("ProductAQuantity">2))---->Amount="2") that, upon recursion of the method 800, is set (at 805) as the current rule. For illustrative purposes, suppose that the user wishes to order twelve items of product A (ProductAQuantity=12), which can be determined from the order information. The method 800 then determines (at 810) that the antecedent of the current rule is met. The method 800 also determines (at 830) that the inference is a numerical value only ("2") and determines (at 845) that the inference does not comprise a discount value. As such, the method returns the numerical value ("2") to the calling rule ((DiscountTypeID#=10001)---->DiscountValue=Amount×"ProductAUnitPrice").

This returns the method to step 852 where the numerical value "2" is received and placed into the inference of the calling rule (to substitute Amount), thereby producing an inference of: DiscountValue="2"×"ProductAUnitPrice." The method then determines (at 830) that the inference of the current rule is a numerical value only since ("2"×"ProductAUnitPrice") is equal to a numerical value since "ProductAUnitPrice" is a known value determined from the product information. The method also determines (at 845) that the inference comprises a discount value (DiscountValue). As such, the method returns (at 855) to the recursive discount applicability method 700 the discount value ("2"×"ProductAUnitPrice") for the current discount type.

Server-Side Determination of Discounts Using Rule-Based Approach

Figure 9:
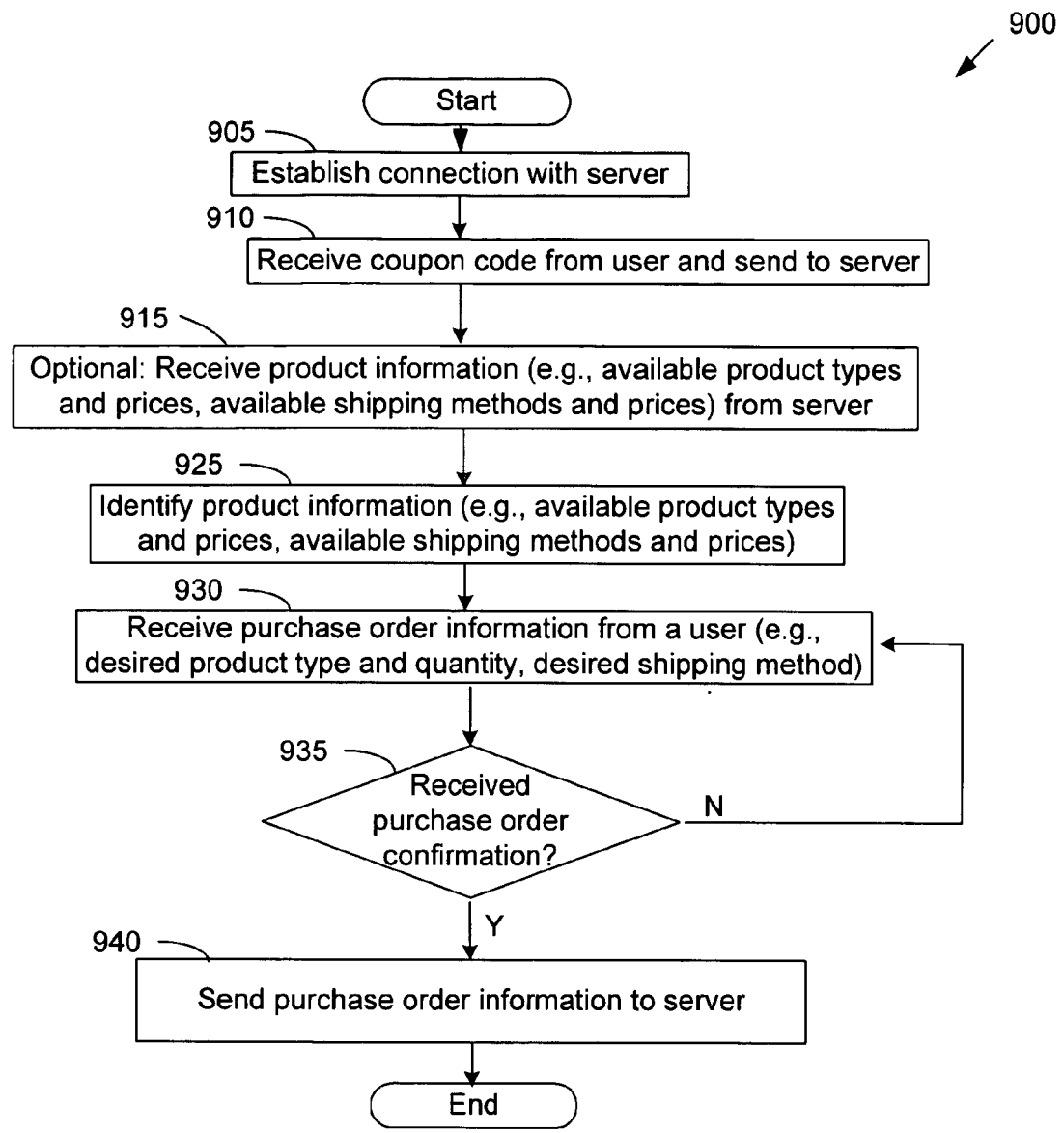
FIG. 9 is a flowchart for an alternative client-side method for automatically determining applicability and value of any discount types for a purchase order made from a client computer, the determinations being made by a server connected with the client computer using a rule-based approach.

FIG. 9 is a flowchart for an alternative client-side method 900 for automatically determining applicability and value of any discount types for a purchase order made from a client computer, the determinations being made by a server connected with the client computer using a rule-based approach. The client-side method 900 may be implemented, for example, by a client computer and an application executing on the client computer, the client computer and application receiving input from a user. In some embodiments, the application is configured to perform the methods of the present invention.

The method 900 begins when it establishes (at 905) a connection (e.g., via a network) with a server to which the order is being sent. The method then receives (at 910) a coupon code from a user and sends the coupon code to the server. As an optional step, the method receives (at 915) product information from the server. The method 900 then identifies (at 925) available product information where the product information may be received (at 915) from the server or be contained in the application executing on the client computer.

The method then receives (at 930) purchase order information from the user. The method determines (at 935) if a purchase order confirmation has been received from the user. If not, the method continues at step 930 where it receives purchase order information from the user. If so, the method sends (at 940) the purchase order information to the server. The method then ends.

Figure 10:
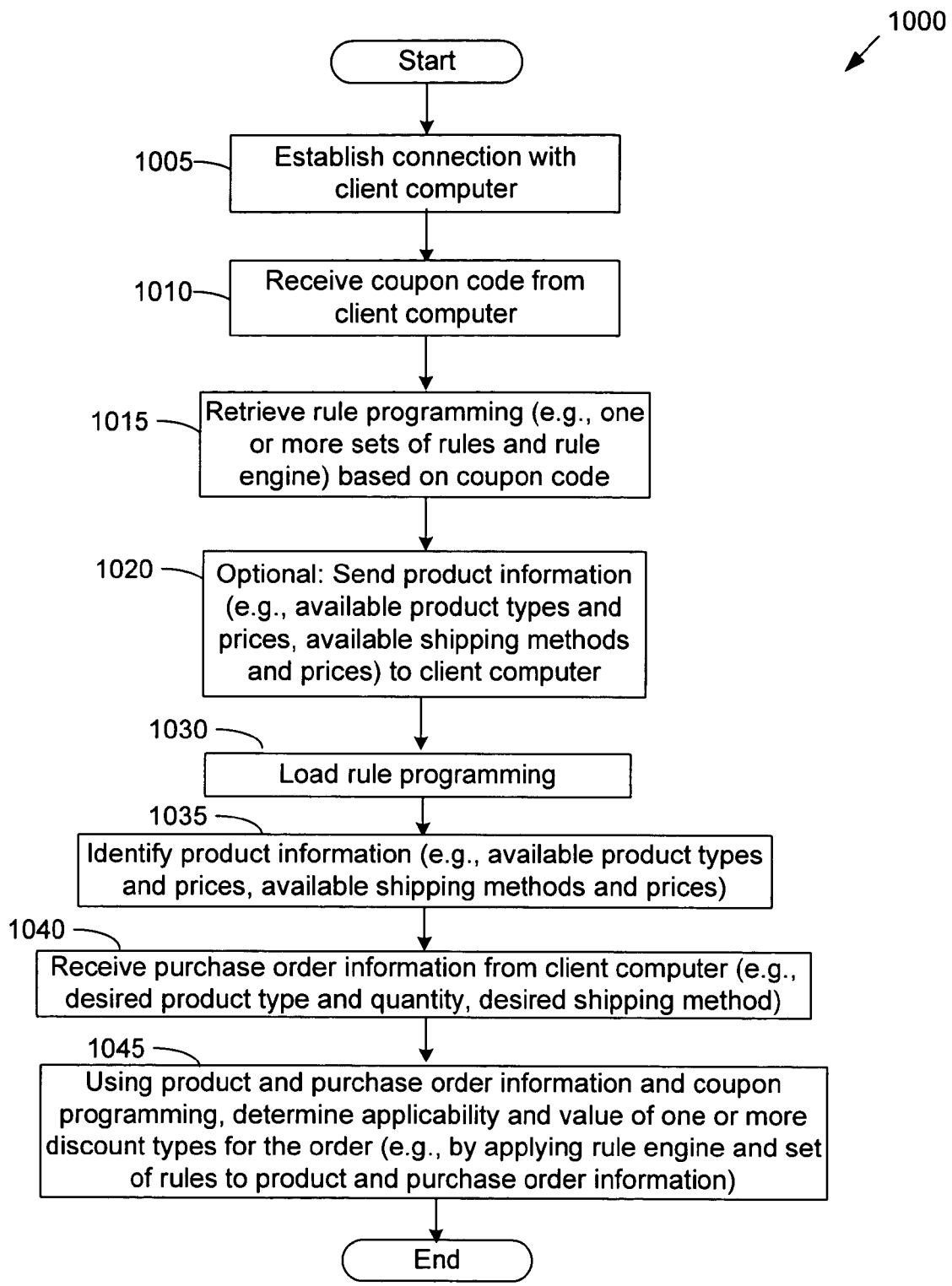
FIG. 10 is a flowchart for an alternative server-side method for automatically determining applicability and value of any discount types for a purchase order made from a client computer, the determinations being made by a server connected with the client computer using a rule-based approach.

FIG. 10 is a flowchart for an alternative server-side method 1000 for automatically (without human intervention) determining applicability and value of any discount types for a purchase order made from a client computer, the determinations being made by a server connected with the client computer using a rule-based approach. The server-side method 1000 may be implemented, for example, by a server computer connected with the client computer and a client-management application executing on the server computer. In some embodiments, the client-management application is configured to perform the methods of the present invention.

The method 1000 begins when it establishes (at 1005) a connection (e.g., via a network) with a client computer from which the order is received. The method then receives (at 1010) a coupon code from the client computer and, at step 1015, retrieves (e.g., from a storage structure of the server computer) one or more sets of rule programming instructions (associated with one or more discount types) based on the coupon code. The set(s) of rule programming instructions comprise a rule engine implemented by rule programming, the rule engine comprising one or more sets of rules and a processing relationship between the sets of rules and the rules in each set of rules. In some embodiments, the rule engine comprises a recursive rule program implemented by rule programming.

As an optional step, the method 1000 sends (at 1020) product information to the client computer. The method loads (at 1030) the retrieved set(s) of coupon programming instructions and identifies (at 1035) available product information. The method then receives (at 1040) purchase order information from the client computer.

Using the retrieved set(s) of rule programming instructions and the product and purchase order information, the method then determines (at 1045) applicability of any discount types for the order and the value of any such applicable discounts by applying the rule engine to the product and order information. In some embodiments, the processes of the rule engine described in relation to FIGS. 4, 5, 6, 7, and 8 comprise step 1045 of. The method then ends.

Figure 11:
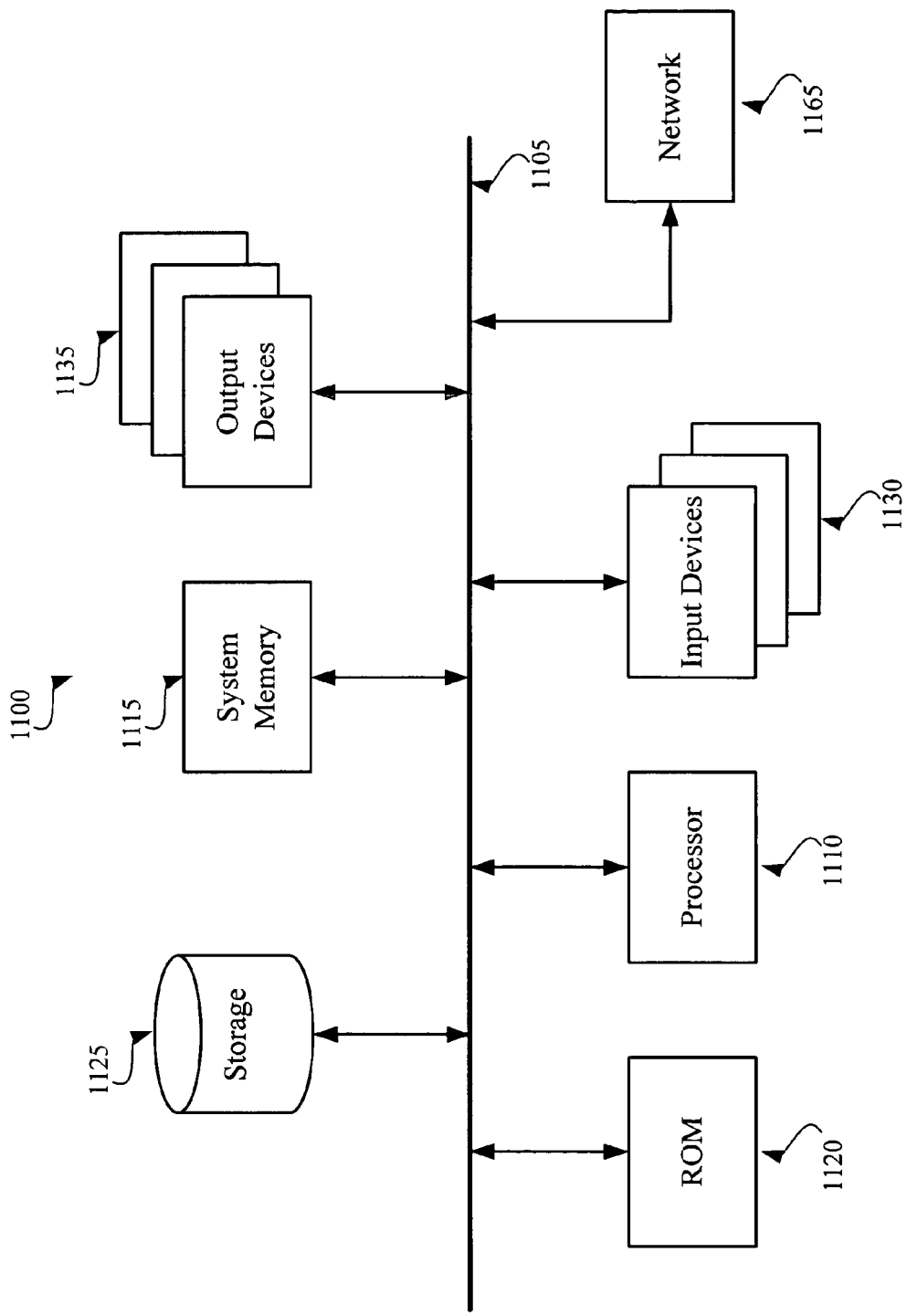
FIG. 11 presents a computer system with which some embodiments of the invention are implemented.

FIG. 11 presents a computer system 1100 with which some embodiments of the invention are implemented. In some embodiments, a client computer and/or server computer comprises the computer system 1100. The computer system 1100 includes a bus 1105, a processor 1110, a system memory 1115,- a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1125. Other embodiments use a removable storage device (such as a floppy disk or zip® disk, and its corresponding disk drive) as the permanent storage device. device 1125. Other embodiments use a removable storage device (such as a floppy disk or zip® disk, and its corresponding disk drive) as the permanent storage device.

Like the permanent storage device 1125, the system memory 1115 is a read-and-write memory device. However, unlike storage device 1125, the system memory is a volatile read-and-write memory, such as a random access memory (RAM). The system memory stores some of the instructions and data that the processor needs at runtime.

In some embodiments, instructions and/or data needed to perform methods of the present invention are stored in the system memory 1115, the permanent storage device 1125, the read-only memory 1120, or any combination of the three. For example, the various memory units may contain coupon programming instructions and/or data relating to product and/or order information. From these various memory units, the processor 1110 retrieves instructions to execute and data to process in order to execute the processes of the present invention.

The bus 1105 also connects to the input and output devices 1130 and 1135. The input devices 1130 enable a user to communicate information and select commands to the computer system 1100. For instance, the input devices 1130 enable the user to communicate order information to the computer system 1100. The input devices 1130 include alphanumeric keyboards and cursor-controllers. The output devices 1135 display images generated by the computer system 1100. For instance, these devices display a user interface (e.g., graphical user interface) through which the user can interface with the computer system 1100. The output devices include printers and display devices, such as cathode ray tubes (CRT) or liquid crystal displays (LCD).

Finally, as shown in FIG. 11, the bus 1105 also couples the computer system 1100 to a network 1165 through, for example, a network adapter (not shown). In this manner, the computer system 1100 can be a part of a network of computers (such as a local area network ("LAN"), a wide area network ("WAN"), or an Intranet) or a network of networks (such as the Internet). Any or all of the components of the computer system 1100 may be used in conjunction with the present invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method comprising:
    sending a recursive engine to a client device, wherein the recursive rules engine comprises a set of discount rules configured automatically determining a purchase order discount from a coupon code when a purchase order is made and when a purchase order is modified, and wherein execution of the recursive rules engine comprises:
        recursively evaluating a first set of rules for determining an applicability of the purchase order discount;
        recursively evaluating a second set of rules for determining a discount value relating to an applicable discount;
        recursively evaluating the first set of rules and the second set of rules by performing an automatic process that recursively calls itself;
    receiving a purchase order placed by a user of the client device along with a coupon code;
    receiving the purchase order discount from the client device for the purchase order as automatically determined by the inks engine upon placement of a purchase order;
    relying on the determination of the rules engine;
    applying the discount without independently determining the purchase order discount; and
    processing the purchase order along with the purchase order discount.

2. The computer-implemented method of claim 1, wherein the purchase order discount comprises a discount type and a discount value relating to the discount type for the purchase order.

3. The computer-implemented method of claim 1, further comprising sending product information to the client device, add wherein the purchase order comprises an instruction to order a product described in the product information.

4. The computer-implemented method of claim 1, wherein the discount rules are further configured for determining a total discount value for a plurality of applicable discount types, the method further comprising executing the discount rules to automatically determine the told discount value associated with the purchase order.

5. The computer-implemented method of claim 1, wherein:
    the set of discount rules comprises a primary set of rules and a secondary set of rules;
    said primary set of rules used to determine applicability of the discount type; and
    said secondary set of rules used to determine a discount value for the discount type, the secondary set of rules being called for processing if the discount typo is determined to be applicable.

6. The computer-implemented method of claim 5, wherein:
    a rule in the set of rules comprises an antecedent and an inference, the inference being determined if the antecedent is determined as true;
    an inference is a numerical value or a set of rules; and
    the rule engine recursively evaluates rules in the primary set of rules to determine inferences until an inference that is a numerical value indicating an applicable discount type is found.

7. the computer-implemented method of claim 5, wherein:
    a rule in the set of rules comprises an antecedent and an inference, die inference being determined if the antecedent determined as true;

an interference is a numerical value or a set of rules; and
the rule engine recursively evaluates rules in the secondary set of rules to determine inferences until an inference that is numerical value indicating a discount value for an applicable discount type is found.

8. A non-transitory computer-readable storage medium comprising:
a medium configured to store computer-readable instructions thereon; and
the computer-readable instructions that, when executed by is processing device cause the processing device to perform a method, comprising:
sending a recursive rules engine to a client device, wherein the rules engine comprises a set of discount rules configured for automatically de fining a purchase order discount from a coupon code when a purchase order is made and when a purchase order is modified, and wherein execution of the rules engine comprises:
recursively evaluating the first set of rules for determining an applicability of the purchase order discount;
recursively evaluating a second set of rules for determining a discount value relating to an applicable discount;
recursively evaluating the first set of rules and the second set of rules by performing an automatic process that recursively calls itself;
receiving a purchase order placed by a user of the client device along with a coupon code;
receiving the purchase order discount from the client device for the purchase order as automatically determined by the rules engine upon placement of a purchase order;
relying on the determination of the rules engine;
applying the discount without independently determining the purchase order discount; and
processing the purchase order along with purchase order discount.

9. The not computer-readable storage medium of claim 8, wherein the purchase order discount comprises a discount type and a discoing value relating to the discount type for the purchase order.

10. The non-transitory computer-readable storage medium of claim 8, the instructions further causing the processing device to perform the step of sending product information to the client device, and wherein the purchase order comprises an instruction to order a product described in the product information.

11. The non-transitory computer-readable storage medium of claim 8, wherein the discount rules are further configured for determining a total discount value for a plurality of applicable discount types, wherein the instructions further causing the processing device to perform the step of executing the discount rules to automatically determine the total discount value associated with the purchase order.

12. The non-transitory computer-readable storage medium of claim 8, wherein:
the set of discount rules comprises a primary set of rules and a secondary set of rules;
said primary set of rules used to determine applicability of the discount type; and
said secondary set of rules used to determine a discount value for the discount type, the secondary set of rules being called for processing if the discount type is determined to be applicable.

13. The non-transitory computer-readable storage medium of claim 12, wherein:
a in the of rules comprises an antecedent and an inference, the inference being determined if the antecedent is determined as true;
an inference is a numerical value or a set of rules; and
the rule engine recursively evaluates rules in the primary set of rules to determine inferences until an inference that is a numerical value indicating an applicable discount type is found.

14. The non-transitory computer-readable storage medium of claim 12, wherein:
a rule in the set of rules comprises an antecedent and an inference, the inference being determined if the antecedent is determined as true;
an inference is a numerical value or a set of rules; and
the rule engine recursively evaluates rules in the secondary set of rules to determine inferences until an inference that is numerical value indicating a discount value for an applicable discount type is found.

15. A system comprising:
a server;
a plurality of provider computers operatively coupled with the server and offering products for sale via the server;
a plurality of client devices operatively coupled with the server,
wherein the server is configured to:
send a reclusive rules engine to a client device from the plurality of client devices, wherein the rules engine comprises a set of discount rules configured for automatically determining a purchase order discount from a coupon code when a purchase order is made and when a purchase order is modified, and wherein execution of the rules engine comprises:
recursively evaluate a first set of rules for determining an applicability of the purchase order discount;
recursively evaluate second set of rules for determining a discount value relating to an applicable discount;
recursively evaluate the first set of rules and the second set of rules by performing an automatic process that recursively calls itself;
receive a purchase order placed by a user of the client device along with a coupon code;
receive the purchase order discount from the client device for the purchase order as automatically determined by the rules engine upon placement of a purchase order;
applying the discount for the purchase order without independently determining the discount;
relying on the determination of the rules engine;
apply the discount without independently determining the purchase order discount; and
process the purchase order along with the purchase order discount.

16. The system of claim 15, wherein the server is further configured to receive product information from a provider computer and send product information to the client device, and wherein the purchase order comprises an instruction to order a product described in the product information.

17. The system of claim 15, wherein the discount rules are further configured for determining a total discount value for a plurality of applicable discount types, wherein the discount rules are configured for executing the discount rules to automatically determine the total discount value associated with the purchase order.

* * * * *

UNITED STATES PATENT AND TRADEMARK OFFICE
CERTIFICATE OF CORRECTION

PATENT NO. : 8,788,330 B2  
APPLICATION NO. : 13/560907  
DATED : July 22, 2014  
INVENTOR(S) : Jonathan B. Leffert Page 1 of 1

It is certified that error appears in the above-identified patent and that said Letters Patent is hereby corrected as shown below:

In the claims:

Column 14, claim 1, line 25, please change "inks" to --rules--;

Column 14, claim 5, line 53, please change "typo" to --type--;

Column 14, claim 6, line 60, please change "rule engine" to --rules engine--;

Column 14, claim 7, line 64, please change "the" to --The--;

Column 14, claim 7, line 66, please change "inference, die" to --inference, the--;

Column 15, claim 7, line 2, please change "rule engine" to --rules engine--;

Column 15, claim 8, line 16, please change "automatically de fining" to --automatically determining--;

Column 15, claim 9, line 41, please change "The not" to --The non-transitory--;

Column 15, claim 9, line 43, please change "a discoing" to --discount--;

Column 16, claim 13, line 3, please change "a in the of rules" to --rule in the set of rules--;

Column 16, claim 15, line 27, please change "send a reclusive rules" to --send a rules engine--.

Signed and Sealed this  
Twenty-fourth Day of February, 2015

Michelle K. Lee  
*Deputy Director of the United States Patent and Trademark Office*